(12) United States Patent
Bickham

(10) Patent No.: US 8,705,922 B2
(45) Date of Patent: Apr. 22, 2014

(54) FEW-MODED OPTICAL FIBERS

(75) Inventor: Scott Robertson Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 421 days.

(21) Appl. No.: 13/164,971

(22) Filed: Jun. 21, 2011

(65) Prior Publication Data

US 2012/0328255 A1 Dec. 27, 2012

(51) Int. Cl.
*G02B 6/028* (2006.01)

(52) U.S. Cl.
USPC ............ 385/124; 385/123; 385/126; 385/127

(58) Field of Classification Search
None
See application file for complete search history.

(56) References Cited

U.S. PATENT DOCUMENTS

| | | | |
|---|---|---|---|
| 4,877,304 A * | 10/1989 | Bhagavatula | ................. 385/124 |
| 6,724,964 B2 | 4/2004 | Lysiansky et al. | |
| 6,888,991 B2 | 5/2005 | White | |
| 7,406,237 B2 | 7/2008 | Bickham et al. | |
| 7,483,612 B2 * | 1/2009 | Digiovanni et al. | .......... 385/123 |
| 7,787,731 B2 | 8/2010 | Bookbinder et al. | |
| 2006/0039664 A1 * | 2/2006 | Bickham | ....................... 385/127 |
| 2006/0045450 A1 * | 3/2006 | Bickham | ....................... 385/127 |
| 2010/0157418 A1 | 6/2010 | Dong et al. | |
| 2010/0195194 A1 * | 8/2010 | Chen et al. | ................. 359/341.3 |

FOREIGN PATENT DOCUMENTS

| WO | 02/21731 | 3/2002 |
|---|---|---|
| WO | WO2010/019222 | 2/2010 |

OTHER PUBLICATIONS

Kubota, H. et al., "Intermodal group velocity dispersino of few-mode fiber", IEICE Electronics Express, vol. 7, No. 20, pp. 1552-1556, Oct. 25, 2010.
Ryf, R. et al., "Space-division multiplexing over 10 km of three-mode fiber using coherent 6×6 MIMO processing", OSA/OFC/NFOEC 2011.
Salsi, M. et al., "Transmission at 2×100Gb/s, over Two Modes of 40km-long Prototype Few-Mode Fiber, using LCOS-based Mode Multiplexer and Demultiplexer", OSA/OFC/NFOEC 2011.
B.Y. Kim, "Few Mode Fiber Devices," Optical Fiber Sensors, 1988 Technical Digest Series vol. 2.
Lenahan, "Calculation of modes in an optical fiber using a finite element method and EISPACK," Bell Syst Tech J., vol. 62, p. 2663 (1983).

\* cited by examiner

*Primary Examiner* — Uyen Chau N Le
*Assistant Examiner* — Chad Smith
(74) *Attorney, Agent, or Firm* — Svetlana Short

(57) ABSTRACT

Few moded optical fibers with small delay differences between the propagating modes are disclosed. In one embodiment, an optical fiber includes a glass core and a glass cladding surrounding and in direct contact with the glass core. The glass core may include a radius $R_1$ from about 8 μm to about 13 μm; a graded refractive index profile with an alpha value between about 1.9 and 2.1 at a wavelength of 1550 nm; and a maximum relative refractive index $\Delta_{1MAX}$ from about 0.6% to about 0.95% relative to the glass cladding. The effective area of the LP01 mode at 1550 nm may be between 80 μm² and 105 μm² such that the core supports the propagation and transmission of an optical signal with X LP modes at a wavelength of 1550 nm, wherein X is an integer greater than 1 and less than 10. The glass cladding may include a maximum relative refractive index $\Delta_{4MAX}$ such that $\Delta_{1MAX} > \Delta_{4MAX}$. The optical fiber has DGD of less than or equal to about 150 ps/km at a wavelength of 1550 nm.

20 Claims, 4 Drawing Sheets

FEW-MODED OPTICAL FIBERS

BACKGROUND

1. Field

The present specification generally relates to optical fibers and, more specifically, to few-moded optical fibers with low loss and small differential group delays.

2. Technical Background

Few-moded fibers (10 or fewer LP modes at 1550 nm) have been designed to transmit optical signals in two or more LP modes. Spatial mode converters can be used to multiplex the optical signals into the fiber and the signals can be decomposed at the receiver using electronic dispersion compensation. The few-moded fibers previously proposed for WDM communications systems have step index cores in which the diameter is increased relative to the single mode fibers in order to support additional modes. One problem with these designs is that there are large delay differences between the fundamental mode and the higher order modes (HOMs). If there is even a small amount of mode mixing in the fiber, the pulses arriving at the detector are degraded due to multipath interference, and this can lead to unsurmountable bit error rate penalties. Another problem is that increasing the core diameter leads to high microbending losses, and although the higher order modes (HOMs) can be designed to have theoretical cutoffs above the 1550 window, these modes are leaky and are not suitable for long transmission spans. A third problem is that the large effective area of the step index fiber is achieved by reducing the refractive index of the core, and this reduces the numerical aperture (NA) of the fiber. This smaller NA can increase both the coupling losses and alignment sensitivity between the spatial mode converter or optical transceiver and the fiber.

Accordingly, a need exists for alternative designs for few-moded optical fibers with low loss, small differential group delays (DGD) and large numerical aperture.

SUMMARY

According to one embodiment an optical fiber may include a glass core and a glass cladding surrounding and in direct contact with the glass core. The glass core may have a radius $R_1$ from about 8 μm to about 13 μm and a graded refractive index profile with an alpha value greater than or equal to about 1.8 and less than about 2.2 at a wavelength of 1550 nm. The maximum relative refractive index $\Delta_{1MAX}$ of the core may be from about 0.6% to about 0.95% relative to the glass cladding. An effective area of the LP01 mode may be greater than 80 μm², for example between 80 μm² and 110 μm², or between 85 μm² and 105 μm², or between 85 μm² and 100 μm². The numerical aperture of the fiber is greater than 0.15 and less than 0.22, for example between 0.15 and 0.20, between 0.15 and 0.17 or between 0.18 and 0.20. The glass core may support the propagation and transmission of an optical signal with X LP modes at a wavelength of 1550 nm, wherein X is an integer greater than 1 and less than 10, for example X=9, X=6, X=4 or X=2. The glass cladding may have a maximum relative refractive index $\Delta_{4MAX}$ such that $\Delta_{1MAX} > \Delta_{4MAX}$, wherein the optical fiber has a maximum differential group delay (DGD) less than or equal to about 150 ps/km, preferably less than 100 ps/km, more preferably less than 50 ps/nm and even more preferably less than 10 ps/nm at a wavelength of 1550 nm. The attenuation of the LP01 mode is less than 0.20 dB/km, preferably less than 0.19 dB/km.

In another embodiment, an optical fiber includes a glass core and a glass cladding surrounding and in direct contact with the glass core. The glass core may have a radius $R_c$ from about 10 μm to about 13 μm and a graded refractive index profile with an alpha value greater than or equal to about 1.8 and less than or equal to about 2.2 at a wavelength of 1550 nm. A maximum relative refractive index $\Delta_{1MAX}$ of the core may be from about 0.7% to about 0.95% relative to an outer cladding layer of the glass cladding. An effective area of the LP01 mode may be between 80 and 120 μm², for example between 80 and 110 μm², or between 80 and 105 μm², or between 85 and 100 μm². The glass core may support the propagation and transmission of an optical signal with X number of LP modes at a wavelength of 1550 nm, wherein X is an integer greater than 1 and less than 10, for example X=9, X=6, X=4 or X=2. The numerical aperture of the fiber is greater than 0.15 and less than 0.22, for example between 0.15 and 0.20 or between 0.18 and 0.20. The glass cladding includes a low index ring layer and may include an optional inner cladding layer surrounding and in direct contact with the glass core. The inner cladding layer may have a relative refractive index $\Delta_2$ such that $\Delta_{1MAX} \geq \Delta_2$. A low index ring may surround and directly contact the inner cladding layer, or alternatively may surround and directly contact the core. The outer cladding layer may surround and directly contact the low index ring. The low index ring has a minimum relative refractive index $\Delta_{3MIN}$ relative to the outer cladding layer and the outer cladding layer has a maximum relative refractive index $\Delta_{4MAX}$ relative to pure silica glass such that $\Delta_{1MAX} > \Delta_{4MAX} > \Delta_{3MIN}$. The optical fiber may have a maximum DGD less than or equal to about 150 ps/km, preferably less than 100 ps/km, more preferably less than 50 ps/nm, more preferably less than 20 ps/nm, and even more preferably less than 10 ps/nm at a wavelength of 1550 nm. The attenuation of the LP01 mode is less than 0.20 dB/km, preferably less than 0.19 dB/km.

In yet another embodiment an optical fiber includes a glass core and a glass cladding surrounding and in direct contact with the glass core. The glass core may have a radius $R_1$ from about 8 μm to about 10 μm and a graded refractive index profile with an alpha value greater than or equal to about 1.8 and less than or equal to about 2.2 at a wavelength of 1550 nm. A maximum relative refractive index $\Delta_{1MAX}$ of the core may be from about 0.6% to about 0.7% relative to an outer cladding layer of the glass cladding. An effective area of the LP01 mode may between 80 and 120 μm², for example between 80 and 110 μm², or between 85 and 105 μm², or between 85 and 100 μm². The glass core may support the propagation and transmission of an optical signal with X LP modes at a wavelength of 1550 nm, wherein X=2. The numerical aperture of the fiber is greater than 0.15 and less than 0.20, and preferably between 0.15 and 0.17. The glass cladding may include an optional inner cladding layer surrounding and in direct contact with the glass core. The inner cladding layer may have a relative refractive index $\Delta_2$ such that $\Delta_{1MAX} > \Delta_2$. A low index ring may surround and directly contact the inner cladding layer, or alternatively may surround and directly contact the core. The outer cladding layer may surround and directly contact the low index ring. The low index ring has a minimum relative refractive index $\Delta_{3MIN}$ relative to the outer cladding layer and the outer cladding layer has a maximum relative refractive index $\Delta_{4MAX}$ relative to pure silica glass such that $\Delta_{1MAX} > \Delta_{4MAX} > \Delta_{3MIN}$. The optical fiber may have a maximum DGD less than or equal to about 150 ps/km, preferably less than 100 ps/km, more preferably less than 50 ps/nm and even more preferably less than 10 ps/nm at a wavelength of 1550 nm. The attenuation of the LP01 mode is less than 0.20 dB/km, preferably less than 0.19 dB/km.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
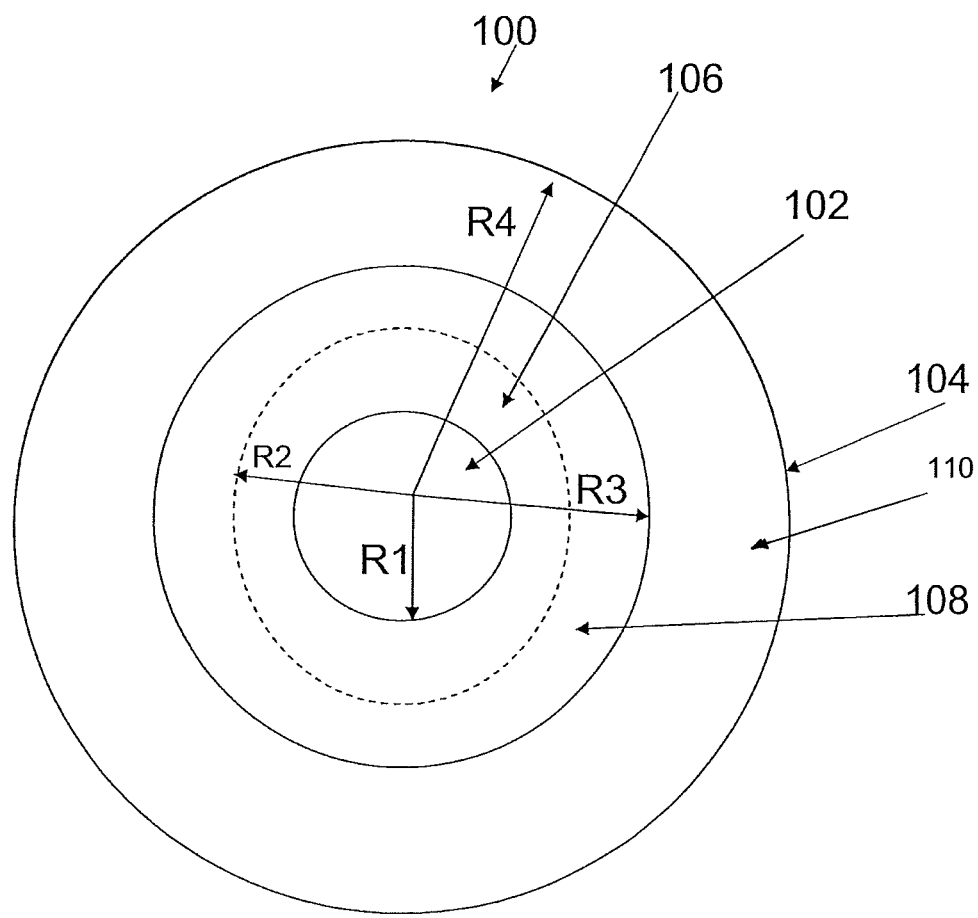
FIG. 1 schematically depicts a cross section of an optical fiber according to one or more embodiments described herein.

Reference will now be made in detail to embodiments of optical fibers for use as long haul transmission fibers, examples of which are illustrated in the accompanying drawings. Whenever possible, the same reference numerals will be used throughout the drawings to refer to the same or like parts. One embodiment of an optical fiber for use as a long haul transmission fiber is schematically depicted in cross section in FIG. 1. The optical fiber generally has a glass core surrounded by a glass cladding. The glass core generally has a radius $R_1$ from about 8 µm to about 13 µm (for example, between 9 µm and 12.5 µm) and a maximum relative refractive index $\Delta_{1MAX}$ from about 0.6% to about 0.95% relative to the glass cladding. An effective area of the LP01 mode is between about 80 and 120 µm$^2$, for example between 80 and 110 µm$^2$, between 85 and 105 µm$^2$ or between 85 µm$^2$ and 100 µm$^2$. The glass core is generally able to support the transmission and propagation of an optical signal with X LP modes at a wavelength of 1550 nm, wherein X is an integer greater than 1 and less than 10, for example X=9, X=6, X=4 or X=2. The glass cladding generally comprises a maximum relative refractive index $\Delta_{4MAX}$ such that $\Delta_{1MAX} > \Delta_{4MAX}$. The optical fiber may have a maximum DGD less than or equal to about 150 ps/km, for example less than 100 ps/km, preferably less than 50 ps/nm and even more preferably less than 10 ps/nm at a wavelength of 1550 nm. The numerical aperture NA of the fiber 100 is greater than 0.15 and less than 0.22, for example between 0.15 and 0.20, between 0.15 and 0.17 or between 0.18 and 0.20. The attenuation of the LP01 mode is less than 0.20 dB/km, preferably less than 0.19 dB/km. The optical fibers and the properties of the optical fibers will be described in more detail herein with specific reference to the appended drawings.

The following terminology will be used herein to described the optical fibers:

The term "refractive index profile," as used herein, is the relationship between the refractive index or the relative refractive index and the radius of the fiber.

The term "relative refractive index," as used herein, is defined as:

$$\Delta(r) = 100 \times [n(r)^2 - n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. In another aspect, $n_{REF}$ is the average refractive index of the cladding. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" of an optical fiber is the area of the optical fiber in which light is propagated and is defined as:

$$A_{\mathit{eff}} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. The effective area is determined at the specified mode (e.g., LP01), at a wavelength of 1550 nm, unless otherwise specified.

The normalized wave number, or V-number of a fiber is defined as $V = k \ast R_1 \ast NA$, where k is the free space wave number, $2\pi/\lambda$, $\lambda$ is the wavelength, $R_1$ is the radius of the core, and NA is the numerical aperture of the fiber. The NA is given by $(n_{core}^2 - n_{clad}^2)^{1/2} = n_{core}[2\Delta_{1MAX}/(1-2\Delta_{1MAX})]^{1/2}$, where $n_{core}$ is the maximum refractive indices of the core, $n_{clad}$ the refractive index of the cladding and $\Delta_{1MAX}$ is the maximum relative refractive index of the core with respect to the cladding.

Chromatic dispersion or dispersion of a fiber is the sum of the material dispersion, the waveguide dispersion, and the inter-modal dispersion.

Unless otherwise specified herein, the above-referenced properties of the optical fiber are at 1550 nm.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength of a single mode fiber corresponds to the cutoff wavelength of the LP11 mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39 44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

As used herein, the term "few moded fiber" refers to a fiber supporting the propagation of more modes than a single mode fiber but fewer modes than a normal multimode fiber. In particular, the term "few moded fiber", as used herein means that the fiber supports 2 to 9 LP modes in a fiber length longer than 22 meters as defined by the cable cutoff measurement. The number of propagating modes and their characteristics in a cylindrically symmetric optical fiber with an arbitrary refractive index profile is obtained by solving the scalar wave equation [see for example T. A. Lenahan, "Calculation of modes in an optical fiber using a finite element method and EISPACK," Bell Syst. Tech. J., vol. 62, no. 1, p. 2663, February 1983]. Light travelling in an optical fiber or other dielectric waveguide forms hybrid-type modes, which are usually referred to as LP (linear polarization) modes. The LP0p modes have two polarization degrees of freedom and are two-fold degenerate, the LP1p modes are four-fold degenerate and the LPmp modes with m>1 are four-fold degenerate. We do not count these degeneracies when we designate the number of LP modes propagating in the fiber. For example, an optical fiber in which only the LP01 mode propagates is a single-mode fiber, even though the LP01 mode has two possible polarizations. A few-moded optical fiber in which the L01 and LP11 modes propagate supports three spatial modes since the LP11 mode is two-fold degenerate, and each mode also has two possible polarizations, giving a total of 6 modes. We designate this fiber as having two LP modes, and by this we mean that it supports the propagation of all of the LP01 and LP11 modes. Similarly, a few-modes fiber designated as having 4 LP modes supports the propagation of all of the LP01, LP11, LP02 and LP21 modes, and a few-modes fiber designated as having 6 LP modes supports the propagation of all of the LP01, LP11, LP02, LP21, LP12 and LP31 modes.

The term graded index, "α-profile" or "alpha profile," as used herein, refers to a relative refractive index profile, expressed in terms of Δ which is in units of "%", where r is the radius and which follows the equation, $$\Delta(r) = \Delta_0 \left[ 1 - \left( \frac{r}{R_1} \right)^\alpha \right],$$

where $\Delta_0$ is the relative refractive index extrapolated to r=0, $R_1$ is the radius of the core, and $\alpha$ is an exponent which is a real number. For a step index profile, the alpha value is greater than or equal to 10. For a graded index profile, the alpha value is less than 10, for example less than 4, less than 3, less than 2.2, or less than or equal to 2.1. The term "parabolic," as used herein, includes substantially parabolically shaped refractive index profiles which may vary slightly from an a value of 2.0 at one or more points in the core, as well as profiles with minor variations and/or a centerline dip. In most cases, accurate parameters of an alpha profile are obtained by numerically fitting a measured relative refractive index profile from 0.05 $R_1 \leq r \leq 0.95\ R_1$. In ideal graded index fibers with no imperfections such as dips or spikes at the centerline, $\Delta_0 = \Delta_{1MAX}$, but in other cases, the value from $\Delta_0$ obtained from the numerical fit from 0.05 $R_1 \leq r \leq 0.95\ R_1$ may be greater or less than $\Delta_{1MAX}$.

Referring to FIG. 1, a cross section of the glass portion of an optical fiber 100 is schematically depicted according to one or more embodiments described herein. The optical fiber 100 generally comprises a core 102 surrounded by and in direct contact with a cladding 104. In the embodiments shown and described herein, the core 102 and the cladding 104 generally comprise silica, specifically silica glass. The cross section of the optical fiber 100 may be generally circular-symmetric with respect to the center of the core 102 and the core 102 may have a radius $R_1$. In the embodiments described herein, the radius $R_1$ of the core 102 is greater than or equal to about 8 μm and less than or equal to about 13 μm (for example, 8 μm, 8.5 μm; 9 μm; 9.5 μm; 10 μm; 10.5 μm; 11 μm; 11.5 μm; 12 μm; 12.5 μm, or any number therebetween). In some embodiments described herein, the radius $R_4$ (i.e., the radius of the glass portion of the optical fiber 100) is about 125 μm. However, it should be understood that the dimensions of the cladding 104 may be adjusted such that the radius $R_4$ may be greater than 125 μm or less than 125 nm.

In the embodiments described herein, the core 102 has a maximum relative refractive index $\Delta_{1MAX}$ relative to the cladding 104 and the cladding 104 has a maximum relative refractive index percent $\Delta_{4MAX}$ relative to pure silica glass, and $\Delta_{1MAX} > \Delta_{4MAX}$.

In the embodiments shown and described herein, the core 102 comprises pure silica glass ($SiO_2$) or silica glass with one or more dopants which increases the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof. In the embodiments described herein, the core 102 contains a sufficient amount of dopant such that the maximum relative refractive index $\Delta_{1MAX}$ of the core 102 is from about 0.6% to about 0.95%, more preferably from about 0.6% to about 0.8%, for example from about 0.6% to about 0.7%, or from about 0.7% to about 0.8%, or from about 0.7% to about 0.9%.

Figure 2A:
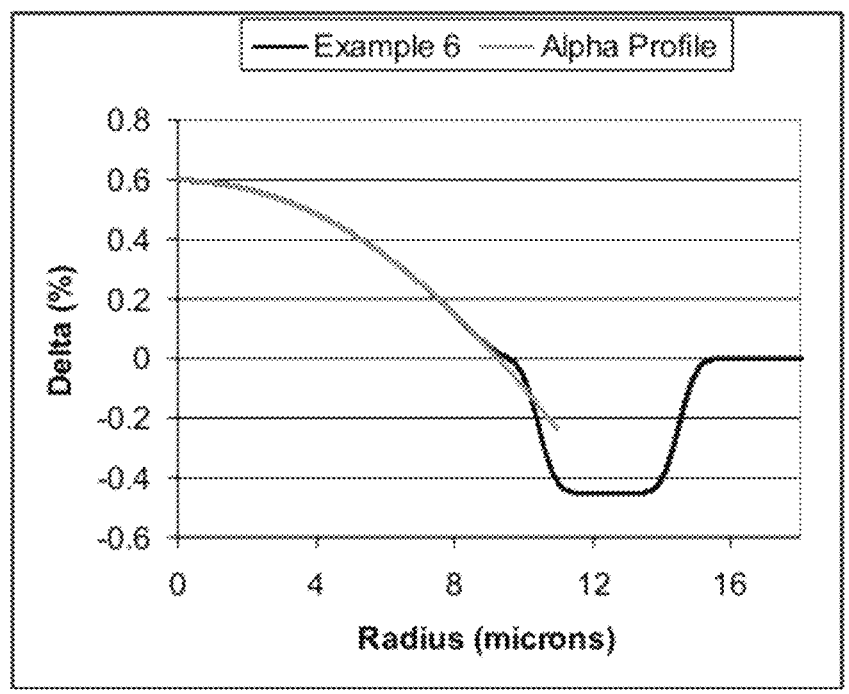
FIGS. 2A, 2B and 2C schematically depict relative refractive index profiles of optical fibers with low index rings according to one or more embodiments shown and described herein.
Figure 2B:
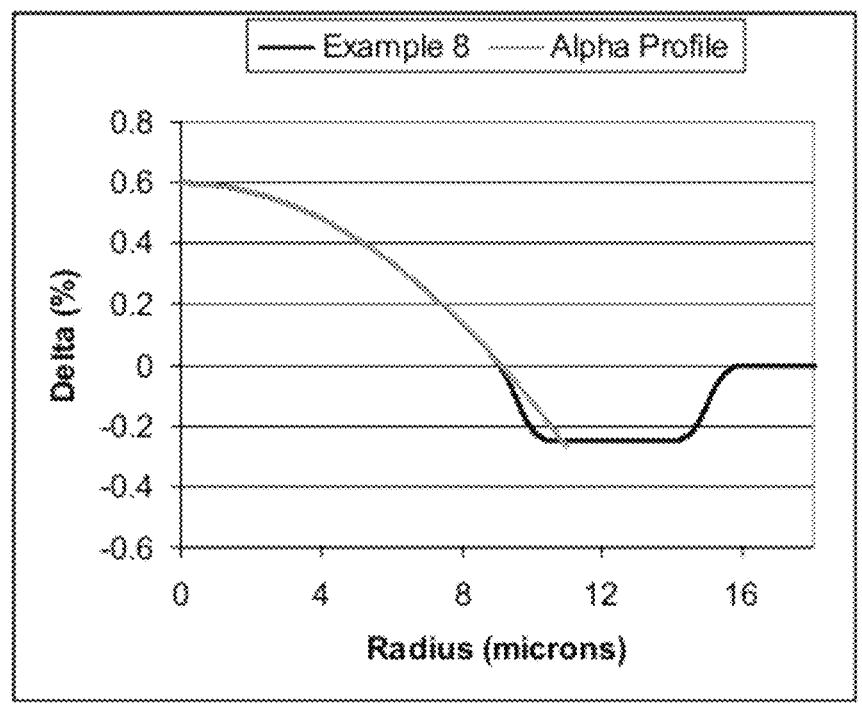
Figure 2C:
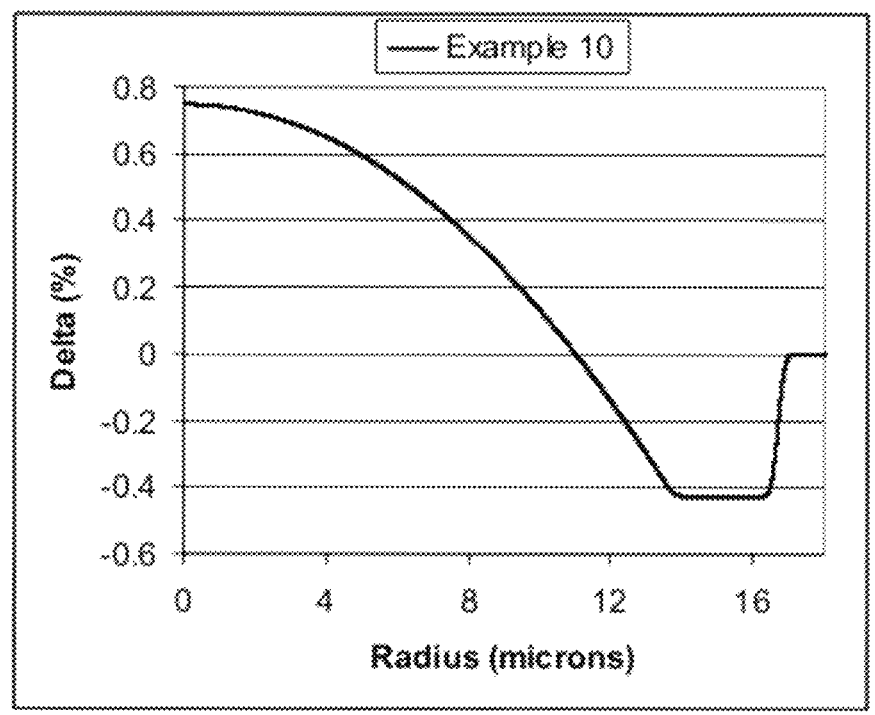

In some embodiments, the core 102 may have a graded refractive index with an alpha profile with an alpha value greater than or equal to 1 and less than 10, preferably greater than or equal to about 1.8 and less than or equal to about 2.2, more preferably greater than or equal to about 1.9 and less than or equal to about 2.1 or less than or equal to 2.05, at a wavelength of 1550 nm, as depicted in FIGS. 2A, 2B and 2C.

In the embodiment of the optical fiber 100 depicted in FIG. 1, the cladding 104 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding 104 is "up-doped," or silica glass with a dopant which decreases the index of refraction, such as fluorine, such as when the inner cladding is "down-doped", so long as the maximum relative refractive index $\Delta_{1MAX}$ of the core 102 is greater than the maximum relative refractive index $\Delta_{4MAX}$ of the cladding 104. For example, in one embodiment, the cladding 104 is pure silica glass. In yet another embodiment, the inner cladding may comprise silica glass up-doped with Cl, $GeO_2$, $TiO_2$, or a similar up-dopant.

More specifically, Referring now to FIGS. 1 and 2A-2C the optical fiber 100 generally comprises a core 102 with a graded refractive index profile and a cladding 104 that comprises at least a low index ring 108 and an outer cladding layer 110. The cladding 104 may also optionally include an inner cladding layer 106, as depicted schematically in FIG. 1. The low index ring 108 may be spaced apart from the core 102 by the inner cladding layer 106, as is schematically illustrated in FIGS. 1 and 2A. Alternatively, the low index ring 108 may surround and directly contact the core portion, as is schematically depicted in FIG. 2B. In some embodiments, the inner cladding layer 106 is an extension of the graded index core, as is schematically depicted in FIG. 2C.

The low index ring 108 is an annular region of silica-based glass which surrounds the core 102. The low index ring 108 assists in further improving the bend performance of the optical fiber 100, as will be described in more detail herein. In embodiments where the cladding 104 comprises an inner cladding layer 106, the inner cladding layer 106 is positioned between the core 102 and the low index ring 108 such that the low index ring 108 is spaced apart from the core 102 (i.e., the low index ring 108 is not in direct contact with the core 102). The width of inner cladding layer, $W_2=R_2-R_1$, is greater than 0.5 μm and less than 4.0 μm, preferably greater than 0.5 μm and less than 2.0 μm, and more preferably greater than 0.5 μm and less than 1.5 μm. In embodiments where the low index ring 108 is spaced apart from the core 102 with the inner cladding layer 106 and the core has a graded refractive index with an alpha profile, the alpha value of the core may be greater than or equal to about 1.8 and less than about 2.2 at a wavelength of 1550 nm, more preferably greater than or equal to about 1.9 and less than or equal to about 2.1 at a wavelength of 1550 nm, even more preferably greater than or equal to about 1.9 and less than or equal to about 2.05 at a wavelength of 1550 nm.

However, in embodiments where the low index ring 108 surrounds and is in direct contact with the core 102, the width of the inner cladding layer is very small but not zero due to the transition between the two regions (i.e., 0 μm≤$R_2-R_1$<0.5 μm, with radial width $W_2$<0.5 μm). In embodiments where the low index ring 108 surrounds and is in direct contact with the core 102 and the core has a graded refractive index with an alpha profile, the alpha value of the core may be greater than or equal to about 1.8 and less than about 2.2 at a wavelength of 1550 nm, more preferably greater than or equal to about 1.9 and less than or equal to about 2.1 at a wavelength of 1550 nm, even more preferably greater than or equal to about 1.9 and less than or equal to about 2.05 at a wavelength of 1550 nm.

Figure 3:
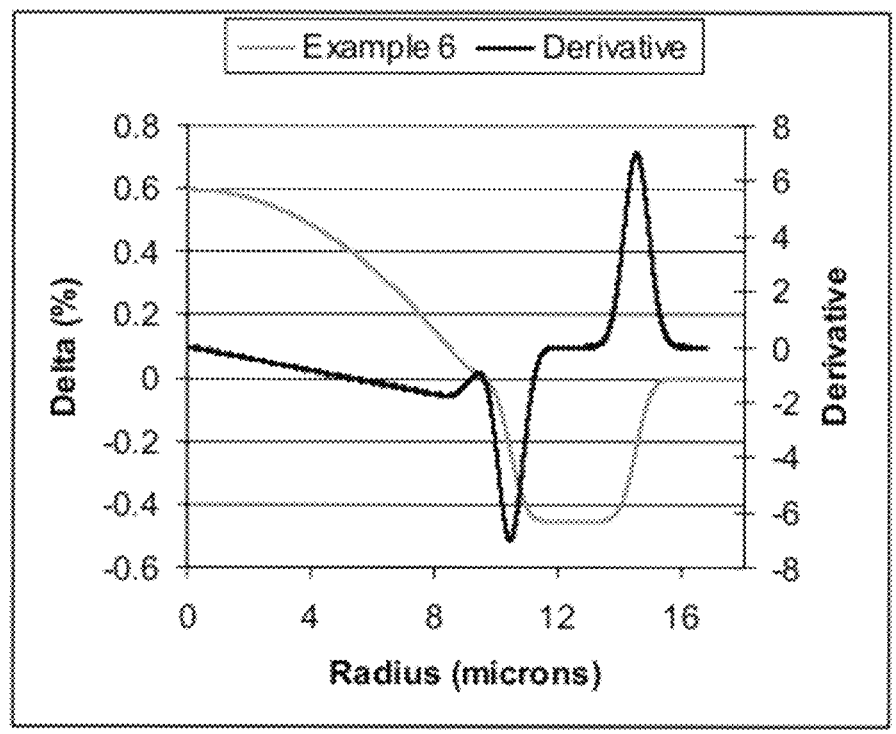
FIG. 3 depicts the refractive index profile of one embodiment of the invention and the derivative of the normalized refractive index profile with respect to the normalized radius.

In the embodiments described herein, $R_2$ is defined as the radius at which the derivative of the normalized refractive index profile with respect to the normalized radius, $d(\Delta/\Delta_{1MAX})/d(r/R_1)$, has a local minimum, as shown in FIG. 3.

In the embodiments described herein, the low index ring 108 comprises $\Delta_3(r)$ with minimum relative refractive index $\Delta_{3MIN}$ and extends from the radius $R_2$ to the radius $R_3$, wherein $R_3$ is the radius at which $\Delta_3(r)$ first reaches a value of greater than −0.05%, going radially outwardly from the radius at which $\Delta_3(r)=\Delta_{3MIN}$. The low index ring 108 has a radial width $W_3=R_3-R_2$. In some embodiments the radial width $W_3$ of the low index ring 108 is from about 2 μm to about 10 μm, for example from about 2 μm to about 8 μm or from about 3 μm to about 7 μm.

The low index ring 108 generally comprises silica glass down-doped to reduce the index of refraction of the low index ring 108 with respect to pure silica glass. For example, the low index ring 108 may be down doped with fluorine, boron and/or combinations thereof in order to decrease the index of refraction of the low index ring 108 with respect to pure silica glass. In the embodiments described herein, the low index ring is formed with a sufficient amount of downdopant such that the minimum relative refractive index percent ($\Delta_{3MIN}$) of the low index ring 108 is from about −0.1% to about −0.7%, more preferably from about −0.25% to about −0.6%, even more preferably about −0.3% to about −0.55% relative to pure silica glass, for example −0.5%≤$\Delta_{3MIN}$≤−0.3%.

The inner cladding 106 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the inner cladding 106 is "up-doped," or silica glass with a dopant which decreases the index of refraction, such as fluorine, such as when the inner cladding is "down-doped." In the embodiments of the optical fiber 100 described herein, the relative refractive index $\Delta_2$ of the inner cladding 106 is less than the maximum relative refractive index $\Delta_{1MAX}$ of the core 102, as shown in FIG. 2A-2C. In some preferred embodiments, the relative refractive index $\Delta_2$ of the inner cladding may be from about −0.6% to about 0.1%. In other preferred embodiments, the relative refractive index $\Delta_2$ of the inner cladding may be from about −0.5% to about 0.0%. The inner cladding 106 is also characterized by the maximum and minimum relative refractive index values $\Delta_{2MAX}$, $\Delta_{1MIN}$ respectively, where $\Delta_{2MAX}>\Delta_{2MIN}$. In at least some embodiments of the optical fiber 100, $\Delta_{2MIN}>−0.6\%$; for example $\Delta_{2MIN}>−0.5\%$; or $\Delta_{2MIN}≥−0.4\%$. In at least some embodiments of the optical fiber 100, $\Delta_{2MAX}<0.1\%$; for example $\Delta_{2MAX}≤−0.0\%$. In at least some embodiments of the optical fiber 100, $\Delta_{2MIN}>−0.6\%$; and $\Delta_{2MAX}≤0.1\%$; for example $\Delta_{2MAX}≤−0.0\%$, and $\Delta_{2MAX}>\Delta_{2MIN}$.

The outer cladding layer 110 surrounds and is in direct contact with the low index ring 108. The outer cladding 110 generally extends from the radius $R_3$ to the radius $R_4$ such that the outer cladding layer has a radial width $W_4=R_4-R_3$. The outer cladding layer 110 generally has a relative refractive index $\Delta_4$ relative to pure silica glass which is greater than the minimum relative refractive index $\Delta_{3MIN}$ of the low index ring 108 and less than the maximum relative refractive index $\Delta_{1MAX}$ of the core 102. In some embodiments, $\Delta_4≥\Delta_{2MAX}$; in other embodiments, $\Delta_4≤\Delta_{2MAX}$. Accordingly, the outer cladding 108 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the outer cladding 108 is "up-doped," or silica glass with a dopant which decreases the index of refraction, such as fluorine, such as when the outer cladding is "down-doped," so long as the relative refractive index $\Delta_4$ of the outer cladding 108 is less than the maximum relative refractive index $\Delta_{1MAX}$ of the core 102 and greater than the minimum relative refractive index $\Delta_{3MIN}$ of the low index ring 108. For example, the outer cladding layer 110 may be up-doped such that the relative refractive index $\Delta_4$ of the outer cladding layer 110 is from about 0.02% to about 0.2% relative to pure silica glass.

Referring to specifically to FIG. 2A, the refractive index profile of one specific embodiment of an optical fiber is graphically depicted. In this embodiment the core of the fiber has a graded refractive index profile with a maximum relative refractive index $\Delta_{1MAX}$. The cladding of the optical fiber is formed with an inner cladding layer having a maximum relative refractive index $\Delta_{2MAX}$ which is less than the maximum relative refractive index $\Delta_{1MAX}$ of the core. A low index ring 108 is positioned directly adjacent to and in contact with the inner cladding layer 106. The low index ring has 108 a minimum relative refractive $\Delta_{3MIN}$ which is less than or equal to $\Delta_{2MAX}$ and less than $\Delta_{1MAX}$. In some preferred embodiments, outer cladding layer 110 surrounds and is in direct contact with the low index ring and has a relative refractive index $\Delta_4$ which is greater than $\Delta_{2MAX}$ and greater than $\Delta_{3MIN}$ and less than $\Delta_{1MAX}$. Accordingly, $\Delta_{1MAX} > \Delta_4 > \Delta_{2MAX} > \Delta_{3MIN}$ in this embodiment. However, it should be understood that other embodiments are possible. For example, $\Delta_4$ may be equal to $\Delta_{2MAX}$. Alternatively, $\Delta_{2MAX}$ may be greater than $\Delta_4$.

In the embodiments of the optical fibers described herein, the combination of the core radius $R_1$ and the maximum relative refractive index $\Delta_{1MAX}$ of the core increase the theoretical cutoff wavelength of the higher order modes of an optical signal propagating in the optical fiber. Increasing the theoretical cutoff wavelength of these higher order modes has the effect of increasing the number of modes which can propagate in the core of the optical fiber and, as a result, the optical fiber becomes few-moded (i.e., the optical fiber supports the propagation and transmission of more modes than a single-mode fiber and fewer modes than a multi-moded fiber, for example the fiber that propagates less than 10 LP modes (e.g., 2-9 LP modes). For example, in the embodiments described herein, the theoretical cutoff wavelength of the LP11 mode of an optical signal having is greater than or equal to 2000 nm, preferably greater than 2200 nm, for example 2200 nm to 4000 nm. Similarly, the theoretical cutoff wavelength of the LP02 mode is greater than or equal to 1200 nm, preferably greater than 1400 nm, for example between 1400 nm and 3000 nm. The theoretical cutoff wavelength of the LP12 mode of an optical signal having a wavelength of 1550 nm is greater than or equal to 1000 nm, preferably greater than 1100 nm, for example between 1100 nm and 2000 nm.

In the embodiments described herein, forming the optical fibers with a core radius in the range of 8 μm to 13 μm (for example, 8 μm, 8.5 μm; 9 μm; 9.5 μm; 10 μm; 10.5 μm; 11 μm; 11.5 μm; 12 μm; 12.5 μm, 13 μm, or any number therebetween) and a relative refractive index $\Delta_{1MAX}$ greater than or equal to about 0.6% and less than or equal to about 0.95% produces an optical fiber which supports X LP modes, where X is an integer. In the embodiments described herein, X is greater than 1 and less than 10. For example, in embodiments where the core of the optical fiber has a graded refractive index profile with an alpha value of about 2, $\Delta_{1MAX}$ from 0.6 to 0.95%, and a radius from about 9 μm to 13 μm, X may be an integer from 2 to 9, for example X=2, X=4, X=6 or X=9.

In addition to increasing the number of higher order modes which can propagate in the core of the optical fiber, optical fibers formed with the structure and properties described above and shown in FIGS. 1, 2A and 2B generally have an increased numerical aperture (NA) and, as such, the optical fibers generally have lower coupling losses to the optical source. Specifically, the combination of a core with a radius from about 8 μm to about 13 μm and a relative refractive index $\Delta_{1MAX}$ greater than or equal to about 0.6% and less than or equal to about 0.95% produces an NA greater than about 0.15, preferably greater than about 0.16 and even more preferably between 0.16 and 0.20.

The optical fibers disclosed herein also have a chromatic dispersion value greater than or equal to about 18 ps/nm/km and less than or equal to about 23 ps/nm/km at 1550 nm. At least some of the exemplary embodiments of the optical fiber 100 propagate at least 2 but fewer than 10 LP modes (e.g., 2, 4, or 6 LP modes), have numerical apertures between 0.15 and 0.22; a DGD less than or equal to about 150 ps/km; LP01 mode dispersion between 18 and 22 ps/nm/km (for example, 20 to 21 ps/nm/km); and attenuation (loss of LP01 mode) at 1550 nm below 0.2 dB/km (for example, 0.16 dB/km to 0.2 dB/km, or 0.18 dB/km to 0.19 dB/km).

Figure 4:
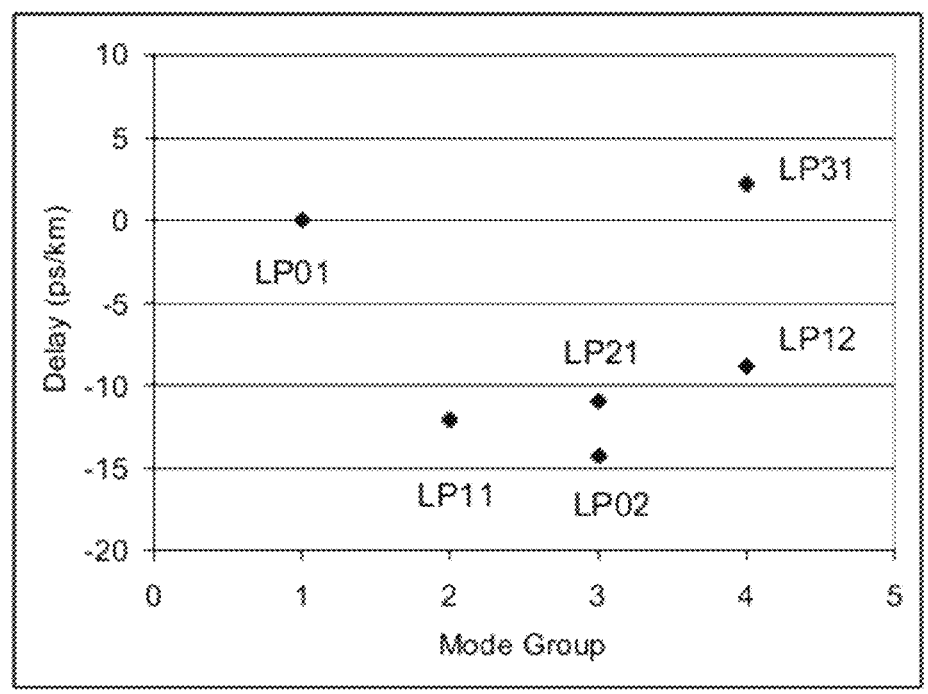
FIG. 4 depicts minimum relative delays vs. Mode Group for one or more embodiments described herein.

Referring now to FIG. 4, the DGD between the fundamental and higher order modes may be reduced by forming the optical fiber with a core having a graded refractive index profile with an alpha value less than 10, as described above. In general, lowering the alpha value from a step index profile alpha value decreases the time delays between modes propagating in the optical fiber. The mode delays in an optical fiber with an arbitrary refractive index profile may be calculated using the method T. A. Lenahan, "Calculation of modes in an optical fiber using a finite element method and EISPACK," Bell Syst. Tech. J., vol. 62, no. 1, p. 2663, February 1983, which is incorporated herein by reference. Equation 47 of this reference is used to calculate the modal delays; however note that the term $dk_{clad}/d\omega^2$ must be replaced with $dk^2_{clad}/d\omega^2$, where $k_{clad} = 2\pi^* n_{clad}/\lambda$ and $\omega = 2\pi/\lambda$. The modal delays are typically normalized per unit length and given in units of ns/km. The inventor has discovered that reducing the alpha value from about 10 to about 2 reduces the DGD by more than two orders of magnitude. Specifically, it has been determined that DGD between higher order modes at 1550 nm can be minimized when the core of the optical fiber has a graded refractive index profile with an alpha value between 1.9 and 2.05. FIG. 4 illustrates the differential group delays of the LP modes (with respect to the LP01 mode) of one exemplary fiber embodiment (Example 1). The magnitudes of the differential group delays are all less than 50 ps/km, which means that signals launched into the different mode groups travel at approximately the same velocities.

Figure 5:
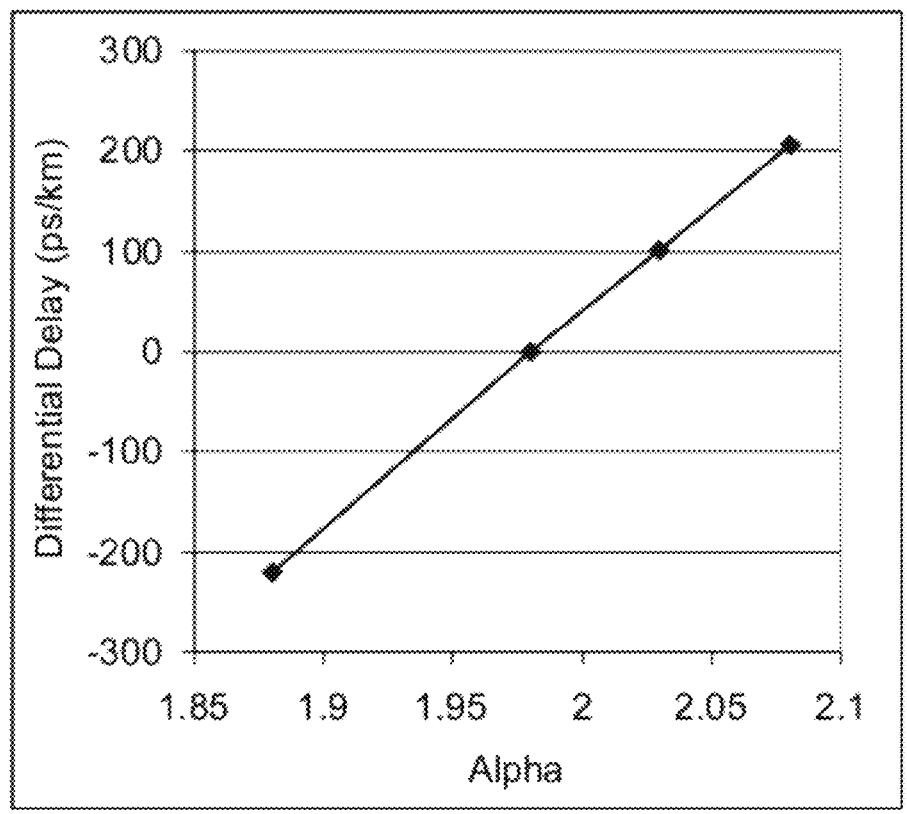
FIG. 5 depicts relative delays of the LP11 mode as a function of the core alpha for one or more embodiments described herein.

Referring now to FIG. 5, the graded index profile of each embodiment also enables the differential group delays of the LP modes to be tuned by a predetermined amount by varying the alpha of the core. Specifically, FIG. 5 illustrates that an alpha value of 1.98 yields a differential group delay between the LP01 and LP11 modes of less than 1 ps/km, so the signals launched into these mode groups travel at almost exactly the same velocities. Decreasing the alpha of the core to a value less than 1.98 to decreases the relative delay of the LP11 mode, which means that it travels faster than the LP01 mode. Increasing the alpha of the core to a value greater than 1.98 to increases the relative delay of the LP11 mode, which means that it travels slower than the LP01 mode.

According to some embodiments the optical fibers 100 propagate fewer than 10 LP modes (for example 2, 4, 6 or 9 LP modes) and have one or more of the following advantageous features: low attenuation (<0.2 dB/km), low microbending losses (wire mesh drum <0.8 dB for the LP01 mode), low dispersion differences between the LP01 mode and higher order modes HOMs (magnitude less than 1 ps/nm/km), and low differential group delays (<150 ps/km). A few-moded optical fiber 100 that propagates between 2 and 6 LP modes at 1550 nm with low attenuation and small differential group delays may be advantageously used for spatial-division multiplexing transmission systems.

Examples

The invention will be further clarified by the following examples.

A plurality of optical fibers were mathematically modeled to determine the effect of variations of alpha, $\Delta_{1MAX}$ and core radius $R_1$ on the effective area of LP01 mode, DGD, fiber attenuation at 1550 nm (for the LP01 mode), and the cut off wavelengths and dispersion at 1550 nm for the different modes. Table 1 contains data for the optical fibers Examples 1-4 with graded refractive index profiles. Specifically, Table 1 contains data for Examples 1-4 which were modeled with cores having graded refractive index profiles with alpha values of between 1.9 and 2.1. The numerical apertures NA of the fiber cores 102 of the optical fibers Examples 1-4 are between 0.18 and 0.205. As shown in Table 1, Examples 1-4 each support the propagation and transmission of at least 4 LP modes (example 1 and 2 fibers support 6 LP modes) and have effective areas between 85 µm² and 110 µm², for example between 85 µm² to 100 µm². Each of these exemplary fibers has low LP01 mode attenuation below 0.2 dB/km at 1550 nm. Each of these exemplary fibers has small differential group delays (less than 50 ps/nm). For example, FIG. 4 illustrates differential mode delays of the LP modes with respect to LP01 mode for the optical fiber of Example 1. FIG. 5 depicts differential mode delays of the LP11 mode as a function of core delta for a fiber that similar to that of Example 4 (all of the parameters for this exemplary fiber were the same as that of Example 4, except for alpha, which was changed to observe the impact of such change on the differential mode delays. FIG. 5 illustrates that decreasing the alpha of the core to a value less than 1.98 to decreases the relative delay of the LP11 mode, which means that it travels faster than the LP01 mode. Increasing the alpha of the core to a value greater than 1.98 to increases the relative delay of the LP11 mode, which means that it travels slower than the LP01 mode.

TABLE 1

|  | Example 1 | Example 2 | Example 3 | Example 4 |
|---|---|---|---|---|
| Delta 1MAX (%) ($\Delta_{1MAX}$) | 0.893 | 0.907 | 0.779 | 0.777 |
| R1 (microns) | 12.43 | 12.34 | 10.27 | 10.27 |
| Alpha | 1.993 | 1.994 | 1.988 | 1.983 |
| R2 (microns) | 13.41 | 13.54 | 11.18 | 10.90 |
| W2 (microns) | 0.98 | 1.20 | 0.91 | 0.63 |
| Delta3MIN (%) | −0.4 | −0.5 | −0.4 | −0.32 |
| R3 (microns) | 17 | 17 | 15 | 15.5 |
| W3 (microns) | 3.59 | 3.47 | 3.82 | 4.60 |
| LP Modes at 1550 nm | 6 | 6 | 4 | 4 |
| LP01 Attn 1550 (dB/km) | 0.186 | 0.186 | 0.186 | 0.186 |
| LP01 Aeff (sq. microns) | 98 | 97.3 | 87.7 | 87.9 |
| NA | 0.195 | 0.196 | 0.182 | 0.181 |
| LP01 Cutoff (microns) | >5 | >5 | >5 | >5 |
| LP11 Cutoff (microns) | 3.882 | 3.822 | 2.924 | 2.922 |
| LP02 Cutoff (microns) | 2.543 | 2.511 | 1.928 | 1.924 |
| LP21 Cutoff (microns) | 2.515 | 2.492 | 1.919 | 1.915 |
| LP12 Cutoff (microns) | 1.886 | 1.870 | <1.5 | <1.5 |
| LP31 Cutoff (microns) | 1.881 | 1.866 | <1.5 | <1.5 |
| LP01 Disp (ps/nm/km) | 20.13 | 20.13 | 20.45 | 20.46 |
| LP11 Disp (ps/nm/km) | 20.37 | 20.37 | 20.72 | 20.72 |
| LP02 Disp (ps/nm/km) | 20.54 | 20.54 | 20.24 | 19.88 |
| LP21 Disp (ps/nm/km) | 20.61 | 20.62 | 20.74 | 20.60 |
| LP12 Disp (ps/nm/km) | 20.36 | 20.70 | N/A | N/A |
| LP31 Disp (ps/nm/km) | 20.75 | 20.85 | N/A | N/A |
| DGD (ps/km) | 16.5 | 22.6 | 13.2 | 13.0 |

Table 2 contains data for Examples 5-8 which were modeled with cores having graded refractive index profiles with alpha values of between 1.9 and 2.1. The numerical apertures NA of the fiber cores 102 of the optical fibers Examples 5-8 are between 0.15 and 0.18. As shown in Table 2, Examples 5-8 each support the propagation and transmission of two LP modes and have effective areas between 85 µm² and 110 µm², for example areas between 85 µm² and 100 µm. Each of these exemplary fibers has low LP01 mode attenuation below 0.2 dB/km at 1550 nm. Each of these exemplary fibers has DGD values less than 5 ps/nm. Also included in Table 2 is a comparative example step index fiber which also supports the propagation and transmission of 2 LP modes. The DGD comparative example is between the LP01 and LP11 modes is approximately 2000 ps/nm, which is three orders of magnitude greater than the DGDs of Examples 5-8 (see below). Each of these exemplary fibers has modeled DGD values less than 10 ps/nm, for example less than 5 ps/nm.

TABLE 2

|  | Example 5 | Example 6 | Example 7 | Example 8 | Comparative |
|---|---|---|---|---|---|
| Delta 1MAX (%) ($\Delta_{1MAX}$) | 0.606 | 0.606 | 0.606 | 0.606 | 0.350 |
| R1 (microns) | 9.25 | 9.27 | 9.01 | 9.11 | 8.00 |
| Alpha | 1.976 | 1.978 | 1.982 | 1.987 | 20 |
| R2 (microns) | 10.29 | 10.47 | 10.08 | 9.58 |  |
| W2 (microns) | 1.04 | 1.20 | 1.07 | 0.47 |  |
| Delta3MIN (%) | −0.4 | −0.45 | −0.4 | −0.25 |  |
| R3 (microns) | 14.5 | 14.5 | 14.5 | 15 |  |
| W3 (microns) | 4.21 | 4.04 | 4.43 | 5.42 |  |
| LP Modes at 1550 nm | 2 | 2 | 2 | 2 | 2 |
| LP01 Attn 1550 (dB/km) | 0.186 | 0.186 | 0.187 | 0.186 | 0.186 |
| LP01 Aeff (sq. microns) | 89.8 | 90.2 | 87.5 | 88.5 | 154 |
| NA | 0.160 | 0.160 | 0.160 | 0.160 | 0.121 |
| LP01 Cutoff (microns) | >5 | >5 | >5 | >5 | >5 |
| LP11 Cutoff (microns) | 2.290 | 2.293 | 2.225 | 2.268 | 2.443 |

TABLE 2-continued

|  | Example 5 | Example 6 | Example 7 | Example 8 | Comparative |
|---|---|---|---|---|---|
| LP02 Cutoff (microns) | <1.55 | <1.55 | <1.55 | <1.55 | <1.55 |
| LP21 Cutoff (microns) | <1.55 | <1.55 | <1.55 | <1.55 | <1.55 |
| LP01 Disp (ps/nm/km) | 20.85 | 20.85 | 20.88 | 20.86 | 22.18 |
| LP11 Disp (ps/nm/km) | 21.06 | 21.13 | 21.10 | 20.73 | 19.22 |
| DGD (ps/km) | 0.190 | 0.260 | 0.860 | 0.030 | 2000 |

Table 3 contains data for Examples 9-10 which were modeled with cores having graded refractive index profiles with alpha values of between 1.9 and 2.1. The inner annular segment in these examples is an extension of the graded index core, as shown in FIG. 2B. The numerical apertures NA of the fiber cores 102 of the optical fibers Examples 9-10 are between 0.15 and 0.20. As shown in Table 1, Examples 9 and 10 support the propagation and transmission of 2 and 4 LP modes, respectively, and have effective areas between 85 $\mu m^2$ and 110 $\mu m^2$. Each of these exemplary fibers has low LP01 mode attenuation below 0.2 dB/km at 1550 nm. Each of these exemplary fibers has modeled DGD values less than 50 ps/nm, for example less than 30 ps/nm.

TABLE 3

|  | Example 9 | Example 10 |
|---|---|---|
| Delta 1MAX (%) ($\Delta_{1MAX}$) | 0.603 | 0.757 |
| R1 (microns) | 9.05 | 11.01 |
| Alpha | 2.013 | 2.011 |
| R2 (microns) | 11.35 | 13.41 |
| W2 (microns) | 2.30 | 2.40 |
| Delta3MIN (%) | −0.4 | −0.424 |
| R3 (microns) | 15 | 16.7 |
| W3 (microns) | 3.66 | 3.30 |
| LP Modes at 1550 nm | 2 | 4 |
| LP01 Attn 1550 (dB/km) | 0.186 | 0.186 |
| LP01 Aeff (sq. microns) | 88.5 | 95.6 |
| NA | 0.160 | 0.179 |
| LP11 Cutoff (microns) | 2.255 | 3.080 |
| LP02 Cutoff (microns) | <1.5 | 2.032 |
| LP21 Cutoff (microns) | <1.5 | 2.024 |
| LP12 Cutoff (microns) | <1.5 | <1.53 |
| LP31 Cutoff (microns) | <1.5 | <1.53 |
| LP01 Disp (ps/nm/km) | 20.85 | 20.50 |
| LP11 Disp (ps/nm/km) | 20.84 | 20.70 |
| LP02 Disp (ps/nm/km) | N/A | 20.31 |
| LP21 Disp (ps/nm/km) | N/A | 20.74 |
| DGD (ps/km) | 0.030 | 27.7 |

In particular, Examples 2-10 demonstrate that the differential group delays can be reduced to less than 150 ps/km while having a numerical aperture greater than 0.15 when the optical fiber is formed with a low index ring and a graded index core.

It should be understood that the optical fibers described herein support the propagation and transmission of more than one mode of an optical signal. Moreover, the increase in the NA decreases the non-linearity of the optical fiber thereby improving the performance of the optical fiber in long-haul optical communications systems.

It should also be understood that the optical fibers described herein with cores having graded refractive index profiles may be used to minimize time delays between higher order modes of optical signals propagating in the core of the optical fiber. Such optical fibers are suitable for use in WDM communications systems where digital signal processing may be readily used to compensate for the minimized time delays in the optical fiber.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising a glass core and a glass cladding surrounding and in direct contact with the glass core, wherein: the glass core comprises: a radius R.sub.1 from 8 .mu.m to 13 .mu.m; a graded refractive index profile with an alpha value greater than or equal to 1.8 and less than 2.2 at a wavelength of 1550 nm; a maximum relative refractive index .DELTA..sub.1MAX from 0.6% to 0.95% relative to the glass cladding; an effective area of LP01 mode between 80 .mu.m.sup.2 and 110 .mu.m.sup.2, the glass core supporting the propagation and transmission of an optical signal with X LP modes at a wavelength of 1550 nm, wherein X is an integer greater than 1 and less than 10; and the glass cladding comprises a maximum relative refractive index .DELTA..sub.4MAX such that .DELTA..sub.1MAX>.DELTA..sub.4MAX, wherein the optical fiber has a maximum differential group delay of less than or equal to about 150 ps/km at a wavelength of 1550 nm.

2. The optical fiber according to claim 1, wherein the optical fiber has a numerical aperture NA where 0.15≤NA≤0.2.

3. The optical fiber according to claim 1, wherein the optical fiber has a maximum differential group delay of less than or equal to about 50 ps/km at a wavelength of 1550 nm.

4. The optical fiber according to claim 3, wherein the optical fiber has a maximum differential group delay of less than or equal to about 10 ps/km at a wavelength of 1550 nm.

5. The optical fiber according to claim 1, wherein the optical fiber has a core with an alpha value greater than or equal to about 1.8 and less than about 2.1, an effective area of LP01 mode between 80 μm² and 105 μm² at a wavelength of 1550 nm; a numerical aperture NA where 0.15≤NA≤0.2; and a maximum differential group delay of less than or equal to about 50 ps/km at a wavelength of 1550 nm.

6. The fiber of claim 1, wherein the alpha value is greater than or equal to about 1.95 and less than or equal to about 2.05 at a wavelength of 1550 nm.

7. The optical fiber of claim 1, wherein the glass cladding comprises a low index ring which is spaced apart from the core by an inner cladding layer.

8. An optical fiber comprising a glass core and a glass cladding surrounding and in direct contact with the glass core, wherein: the glass core comprises: a radius R.sub.c from 10 .mu.m to 13 .mu.m; a graded refractive index profile with an alpha value between 1.95 and 2.1 at a wavelength of 1550 nm; a maximum relative refractive index .DELTA..sub.1MAX from 0.7% to 0.95% relative to an outer cladding layer of the glass cladding; an effective area of LP01 mode between 85 .mu.m.sup.2 and 100 .mu.m.sup.2, the glass core supporting the propagation and transmission of an optical signal with X LP modes at a wavelength of 1550 nm, wherein X is an integer greater than 1 and less than 10; and the glass cladding comprises: a low index ring surrounding said core; and an outer cladding layer that surrounds and is in direct contact with the low index ring, wherein the low index ring has a minimum relative refractive index .DELTA..sub.3MIN relative to the outer cladding layer and the outer cladding layer has a maximum relative refractive index .DELTA..sub.4MAX relative to pure silica glass such that .DELTA..sub.1MAX>.DELTA..sub.4MAX>.DELTA..sub.3MIN, wherein the optical fiber has a maximum differential group delay of less than or equal to about 150 ps/km at a wavelength of 1550 nm.

9. The optical fiber of claim 8, further comprising an inner cladding layer surrounding and in direct contact with the glass core, the inner cladding layer having a maximum relative refractive index $\Delta_{2MAX}$ such that $\Delta_{1MAX}>\Delta_{2MAX}\geq\Delta_{3MIN}$; said low index ring surrounding and in direct contact with the inner cladding layer.

10. The optical fiber according to claim 8, wherein the optical fiber has a numerical aperture NA where $0.15 \leq NA \leq 0.2$.

11. The optical fiber according to claim 8, wherein the optical fiber has a maximum differential group delay of less than or equal to about 50 ps/km at a wavelength of 1550 nm.

12. The optical fiber according to claim 8, wherein X is an integer greater than 2 and less than 7.

13. The optical fiber according to claim 8, wherein the glass core has a numerical aperture NA where 0.15<=NA<=0.2; and a maximum differential group delay of less than or equal to about 50 ps/km at a wavelength of 1550 nm.

14. An optical fiber comprising a glass core and a glass cladding surrounding and in direct contact with the glass core, wherein: the glass core comprises: a radius R.sub.c from 8 .mu.m to 10 .mu.m; a graded refractive index profile with an alpha value between 1.95 and 2.1 at a wavelength of 1550 nm; a maximum relative refractive index .DELTA..sub.1MAX from 0.6% to 0.7% relative to an outer cladding layer of the glass cladding; an effective area of LP01 mode between 85 and 100 .mu.m.sup.2, the glass core supporting the propagation and transmission of an optical signal with X LP modes at a wavelength of 1550 nm, wherein X is an integer greater than 1 and less than 10; and the glass cladding comprises: a low index ring surrounding the core; and an outer cladding layer that surrounds and is in direct contact with the low index ring, wherein the low index ring has a minimum relative refractive index .DELTA..sub.3MIN relative to the outer cladding layer and the outer cladding layer has a maximum relative refractive index .DELTA..sub.4MAX relative to pure silica glass such that .DELTA..sub.1MAX>.DELTA..sub.4MAX>.DELTA..sub.3MIN, wherein the optical fiber has a maximum differential group delay of less than or equal to about 150 ps/km at a wavelength of 1550 nm.

15. The optical fiber of claim 14, further comprising an inner cladding layer surrounding and in direct contact with the glass core, the inner cladding layer having a maximum relative refractive index $\Delta_{2MAX}$ such that $\Delta_{1MAX}>\Delta_{2MAX}\geq\Delta_{3MIN}$; said low index ring surrounding and in direct contact with the inner cladding layer.

16. The optical fiber according to claim 14, wherein the optical fiber has a numerical aperture NA where $0.15 \leq NA \leq 0.2$.

17. The optical fiber according to claim 14, wherein the optical fiber has a maximum differential group delay of less than or equal to about 50 ps/km at a wavelength of 1550 nm.

18. The optical fiber according to claim 14, wherein the optical fiber has a maximum differential group delay of less than or equal to about 10 ps/km at a wavelength of 1550 nm.

19. The optical fiber according to claim 14, wherein X=2.

20. The optical fiber according to claim 14, wherein the glass core has a numerical aperture NA where 0.15<=NA<=0.2; and a maximum differential group delay of less than or equal to about 50 ps/km at a wavelength of 1550 nm.

* * * * *